United States Patent [19]

Krueger

[11] 4,402,172

[45] Sep. 6, 1983

[54] FLEXIBLE PACKAGING STRUCTURE AND PROCESS FOR MAKING IT

[75] Inventor: Duane A. Krueger, Neenah, Wis.

[73] Assignee: American Can Company, Greenwich, Conn.

[21] Appl. No.: 218,947

[22] Filed: Dec. 22, 1980

[51] Int. Cl.³ .............................................. B65B 55/06
[52] U.S. Cl. ...................... 53/425; 53/452; 53/479; 53/140
[58] Field of Search .............. 53/452, 456, 467, 477, 53/479, 463, 140, 141, 425

[56] References Cited

U.S. PATENT DOCUMENTS

| | | | |
|---|---|---|---|
| 3,414,551 | 12/1968 | Reid et al. | 260/88.2 |
| 3,499,819 | 3/1970 | Lewis . | |
| 3,508,947 | 4/1970 | Hughes | 53/140 X |
| 3,832,827 | 9/1974 | Lemelson | 53/425 X |
| 3,892,058 | 7/1975 | Komatsu et al. | 53/425 |
| 3,928,687 | 12/1975 | Wada et al. | 428/461 |
| 4,190,477 | 2/1980 | Ossian et al. | 156/244.11 |
| 4,308,084 | 12/1981 | Ohtusuki et al. | 156/233 |
| 4,310,578 | 1/1982 | Katsura et al. | 428/35 |

FOREIGN PATENT DOCUMENTS

| | | |
|---|---|---|
| 19835 | 12/1980 | European Pat. Off. . |
| 1020740 | 2/1966 | United Kingdom . |
| 1128929 | 10/1968 | United Kingdom . |
| 2018679 | 10/1979 | United Kingdom . |
| 2027391 | 2/1980 | United Kingdom . |

*Primary Examiner*—Horace M. Culver
*Attorney, Agent, or Firm*—Stuart S. Bowie; Thomas D. Wilhelm

[57] ABSTRACT

This invention is a novel laminate, and a process for making a laminate packaging material suitable for use with food in a retort environment. In the first step, polypropylene is coextruded with an anhydride modified polypropylene. In the second step the modified polypropylene is adhered to unprimed metal foil in a hot combining nip. In the third and final step, the surface of the foil opposite the surface affixed to the modified polypropylene is adhesively laminated to a biaxially oriented polymer.

3 Claims, 3 Drawing Figures

FLEXIBLE PACKAGING STRUCTURE AND PROCESS FOR MAKING IT

BACKGROUND OF THE INVENTION

This invention is directed at laminate structures, and particularly at laminate structures suitable for use under retort conditions. The packaging industry has expended enormous sums of money over many years attempting to develop and commercialize retortable pouches.

A typical retort pouch is made of face-to-face laminate structures which are sealed together on three sides before filling, and are sealed on the fourth side after filling. The sealed retort pouches usually are heated or retorted after final sealing to cook the contents of the pouch and to kill all organisms within the pouch.

A significant problem encountered in development of retort pouches is the construction of the multiple layer laminate structure from which the pouch is formed. Typical laminate structures comprise an aluminum foil with a polyester adhesively attached to one side thereof, frequently by means of a polyester urethane adhesive, and a sealable lamina attached to the second side of the foil.

If all that was desired was the structuring of a pouch, the aluminum foil could be attached to the sealable lamina in the same manner as it is attached to the polyester lamina, namely by a polyester urethane adhesive. However, polyester urethanes have not been approved by governmental authorities because of possible contamination of the contained food. Therefore, for retort pouches for enclosing food, a primer of maleic anhydride polymer grafted onto polypropylene is conventionally coated on the second surface of the aluminum foil, and then it is heat-cured in line with the coating operation. Such materials are known by the trade names Hercorprime and Morprime. An inner sealant layer of polypropylene may then be attached onto the primer at high temperatures on the order of 500° Fahrenheit. Unfortunately, the high temperature heating of the sealant layer of polypropylene appears to oxidize the surface of the polypropylene, thereby increasing the difficulty of sealing the laminate structures together to form the pouch.

In a recent development, a separate layer of polypropylene is extruded into a combining nip as an adhesive between a previously formed sealant layer of polypropylene and the cured primer. While this recent development appears to have solved the heat sealing problem, making the pouch functional, it is desirable to reduce the cost of the structure in order to enhance its competitive position relative to other packaging structures.

In the recent development cited above, constructing the laminate requires six steps.

(1) coat foil with primer liquid
(2) evaporate primer solvent
(3) cure primer in oven
(4) adhesive laminate unprimed side of foil to polyester
(5) extrude sealant layer
(6) extrusion laminate the final structure together.

It is an object of this invention to reduce the number of processing steps required in making a laminate suitable for use in retortable pouches.

Another object is to reduce the handling of unsupported metal foil both in machine operations, and in moving the foil between machines for subsequent operations and treatments in construction of the laminate.

SUMMARY OF THE INVENTION

These objects are attained in a novel process for making package material having a multiple layer laminate comprising a plurality of sheet-like materials. The first step in the process is coextruding a multiple layer film having as one outside layer thereof polypropylene modified with a fused ring organic acid anhydride, the layer adjoining the modified polypropylene layer being a polypropylene layer.

The next step in the process is drawing the coextruded film and an unprimed aluminum foil into and through a nip of rolls, with the modified polypropylene layer being positioned in face-to-face relation with the foil.

In the process of drawing the layers into and through the nip, effective amounts of heat and pressure are applied over effective periods of time respectively to adhere the foil to the film at the interface of the foil with the modified polypropylene layer. The pressure is applied at the nip. The heat is applied during contact of the layers with the rolls.

The third step required is adhesive laminating a biaxially oriented polyester film to the exposed surface of aluminum foil.

The process includes the subsequent steps of forming a portion of the multiple layer laminate into a pouch, filling a product into the pouch, closing and sealing the pouch, and heating the filled and sealed pouch under retort conditions of at least about 100° C. for at least about 5 minutes.

Desirably, the polypropylene in both the polypropylene and the modified polypropylene layers is a copolymer of propylene and ethylene containing up to about 20% ethylene.

DETAILED DESCRIPTION OF THE INVENTION

Figure 1:
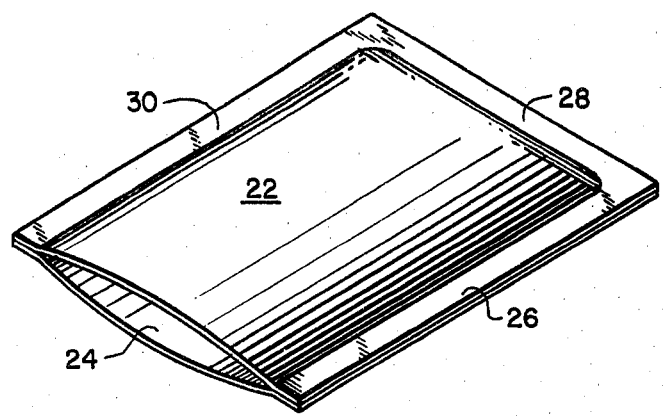
FIG. 1 shows a retort pouch sealed around three edges and ready for filling.

FIG. 1 shows a retort pouch having substantially similar top and bottom walls 22 and 24 sealed together on three edges 26, 28, and 30, and open on the fourth edge to receive product. After product is placed in the pouch, the fourth edge is sealed, and the entire pouch with the product therein is heated or retorted, as may be desired for the product contained in the pouch.

Figure 2:
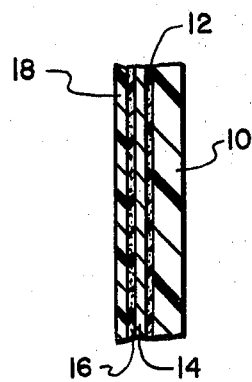
FIG. 2 is a cross-section, with thicknesses exaggerated, of a laminate structure in accordance with this invention.

The novel laminate structure used for each of the side walls 22 and 24 is shown in FIG. 2. The inside, or sealant, layer 10 is the layer that contacts the product. Layer 10 is attached by layer 12 to the aluminum, or other metal, foil 14. On the exterior side of the laminate structure a biaxially oriented polyester layer 18 is attached by an adhesive 16 to the foil 14. The layer 18 physically protects the foil from being penetrated or otherwise physically damaged.

The layer 10 is an extrusion grade polypropylene or polypropylene copolymer or polypropylene polyethylene blend. One acceptable material is propylene ethylene copolymer sold by Hercules Chemical Company as SA-752.

The layer 12 is a polypropylene based polymer, and may contain polypropylene homopolymer, ethylene propylene copolymer or a blend of polypropylene and polyethylene, or may be a mixture of any of the compositions recited for this layer, with the total weight percent ethylene in the layer not to exceed about 8%, so that the layer 12 may function properly within the laminate under retort conditions.

One further component in layer 12 is a fused ring organic acid anhydride. The acid anhydride is preferably present as a moiety chemically grafted onto the polypropylene as a graft copolymer. It may alternatively be blended into the polymer material of layer 12.

The amount of acid anhydride combined with the polymer is quite variable. Broadly speaking, the invention may be successfully carried out with acid anhydride content between 0.01% and 3% by weight of the total polymer. Preferably, the amount of acid anydride is between 0.07% and 0.43%. One material acceptable for use directly as the composition of layer 12 is sold by Mitsui Petrochemical Industries as Admer QF-500. Another acceptable composition may be obtained by mixing together from 5% to 30% of Hercoprime and 70% to 95% of SA-752 propylene ethylene copolymer. Both polymers are sold by Hercules Chemical Company. Hercoprime is a graft copolymer of maleic anhydride onto a polypropylene backbone. The Hercoprime may additionally include about 3% ethylene vinyl acetate. SA-752 contains 4% ethylene.

Figure 3:
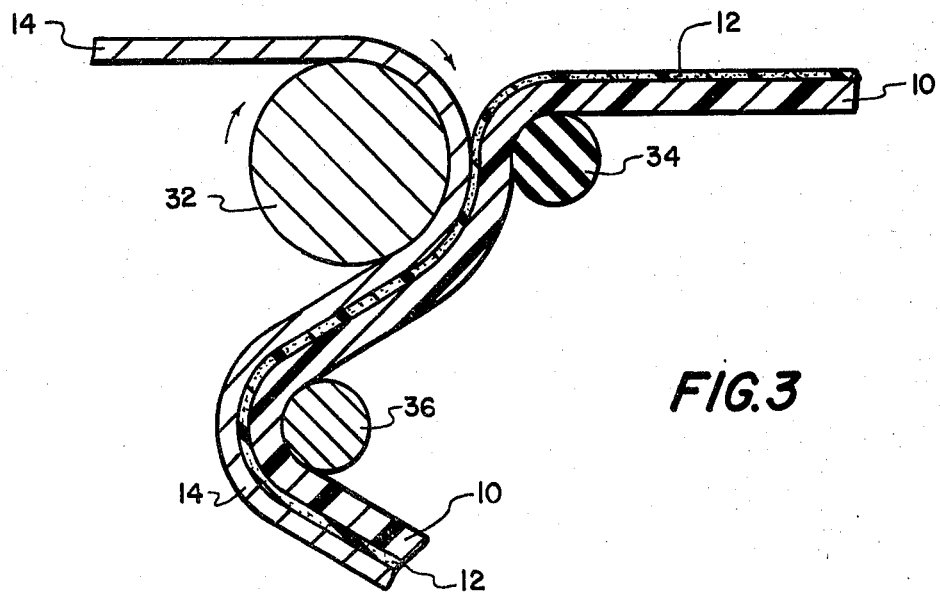
FIG. 3 shows the 3-layer laminate subassembly of this invention being assembled.

The novel steps in constructing the laminate shown in FIG. 2 are best illustrated in FIG. 3. In the initial step of the process, layers 10 and 12 are coextruded and wound up. In the second step, the coextruded film and aluminum foil 14 are pulled by the hot nip formed by rolls 32 and 34 into that nip. The combination of heat and pressure in the hot nip is effective to activate adhesion between the foil 14 and the modified polypropylene layer 12. Heat may continue to be applied after the three layer structure exits the nip by wrapping the exiting structure around roll 32. The foil layer serves as a convenient and efficient conductor of heat from roll 32 to the interface of the foil with layer 12.

Roll 32 is steel and is heated by hot oil. Its temperature is controlled in the area of from about 350° F. to about 400° F. Roll 34 is an unheated rubber roll. During the operation of the process, roll 34 does increase in temperature by means of conduction of heat through the layers 10, 12 and 14 from roll 32; and reaches a steady state temperature somewhat below that of roll 32.

After the three layer structure leaves contact with heated roll 32 it is passed over one or more cooling rolls 36 which are maintained at about 70° F., to cool the structure and thus ensure the setting and permanence of the bond between layers 12 and 14.

In the third step, a film of biaxially oriented polymer is adhesively laminated to the surface of the foil opposite the surface adhered to the modified polypropylene in known manner, to complete the laminate structure as shown in FIG. 2.

EXAMPLE 1

A two layer, three mil thick, film was cast coextruded on conventional extrusion equipment at a die temperature of 500° F. and chill roll temperature of 80° F., and wound up. The film was, by weight, 10% Admer QF-500 and 90% Hercules SA-752 propylene ethylene copolymer. The coextruded film was unrolled and pulled into a hot nip between a heated steel roll 24 inches in diameter and an unheated rubber roll 6 inches in diameter, the film on the incoming side of the nip wrapping the rubber roll, and the SA-752 propylene ethylene layer being in contact with rubber roll 34. Aluminum foil 0.0005 inches thick was pulled into the nip, the foil on the incoming side of the nip wrapping the heated steel roll 32. The foil was pressed against the Admer layer with a pressure of approximately 40 pounds of force per square inch. The temperature of the hot roll was 390° F. at the start of the run, and gradually dropped to 360° F. and remained steady. Line speed through the nip was 20 feet per minute. The three layer structure was in contact with the hot roll for a distance of 24 inches, giving approximately 6 seconds of contact time, when the three layer structure was in contact with the hot roll. The three layer structure was subsequently passed over 2 cooling rolls 6 inches in diameter, the cooling rolls being maintained at about 70° F.

EXAMPLE 2

A three layer structure was made the same as in EXAMPLE 1 except the line speed through the hot nip in the process of constructing the three layer structure was 30 feet per minute.

EXAMPLE 3

A three layer structure was made the same as in EXAMPLE 1 except the line speed through the hot nip in the process of constructing the three layer structure was 40 feet per minute.

EXAMPLE 4

A three layer structure was made the same as in EXAMPLE 1 except the line speed through the hot nip in the process of constructing the three layer structure was 50 feet per minute.

Table 1 shows the adhesion at the interface between the coextruded film and the foil for the 3-layer films in each of the four examples. The adhesion is measured as peel strength in pounds per ½ inch width strip.

In preparing specimens for the peel test, aluminum foil coated with ethylene acrylic acid was heat sealed to the foil side of the 3-layer structure. The material was cut into ½ inch widths and tested in a Chatillon tester, manufactured by John Chatillon and Sons, New York. The crossing head speed was 10 inches per minute.

TABLE 1

| Example No. | Peel Strength |
| --- | --- |
| 1 | 1.7 |
| 2 | 1.2 |
| 3 | 1.1 |
| 4 | 0.9 |

Using the 3-layer structure of EXAMPLE 1, the uncoated side of the foil was adhesively laminated to a 48 gauge biaxially oriented polyester film, using a polyester urethane adhesive sold by Morton Chemical Company as Adcote 550. The resulting 5-layer structure was used to make retort pouches. The pouches were filled with food, sealed, and heated under retort conditions at 115° C. for 15 minutes. Adhesion values at the interface between the foil and the coextrusion were measured in the 5-layer structure, both before and after the retort processing. These tests were performed on one inch strips of the 5-layer structure without prior modification of the 5-layer structure. The tests were performed on an Instrom Tensile Tester at crossing head speed of 10 inches per minute. The results showed peel strengths of 1.7 pounds before retort processing and 2.8 pounds after retort processing.

The heat applied by the retort process is concluded to be responsible for the increased level of adhesion after the retort processing. Table 1 indicates that levels of adhesion before retort processing may also be controlled by the line speed of the combining operation of FIG. 3.

The organic acid anhydride may be any compound capable of being grafted to polypropylene by a suitable radical reaction initiator such as the organic peroxides, for example, benzoyl peroxide.

Thus it is seen that the number of processing steps required in making a laminate suitable for use in retort pouches is reduced. Further the handling of unsupported metal foil is limited to its travel path between its unwinding and its joinder with the coextruded film at the hot nip in the second step of the process. Also the total number of layers in the laminate is reduced from a conventional six layers in the prior art to five layers, thus achieving a degree of structural simplicity.

I claim:

1. A process for making a multiple layer laminate packaging material and for making a package from said material, the process comprising the steps of:

coextruding a multiple layer film having as one outside layer thereof polypropylene modified with a fused ring acid anhydride, the layer adjoining said modified polypropylene layer being a polypropylene layer;

drawing said coextruded film and an unprimed aluminum foil into and through a nip of rolls, with said modified polypropylene layer being positioned in face to face relation with said foil;

applying effective amounts of heat and pressure, over effective periods of time respectively to adhere said foil to said film at the interface of said foil with said modified polypropylene layer, forming therefrom a multiple layer laminate packaging material, said pressure being applied at said nip, said heat being applied during contact of said sheet-like materials with said rolls;

adhesively laminating a biaxially oriented, abuse resistant, polymer film to the surface of said foil opposite the surface adhered to said anhydride modified polypropylene;

forming a portion of said multiple layer packaging material into a pouch;

filling a product into the pouch;

closing and sealing the pouch;

and heating the filled and sealed pouch under retort conditions of at least about 100° C. for at least about 5 minutes, to affect increased levels of adhesion between said foil and said modified polypropylene layer.

2. A process as in claim 1 wherein the polypropylene in said modified polypropylene layer is a copolymer of propylene and ethylene containing up to about 8% ethylene.

3. A process as in claim 1 wherein said polypropylene layer is a copolymer of propylene and ethylene containing up to about 8% ethylene.

* * * * *

UNITED STATES PATENT AND TRADEMARK OFFICE
CERTIFICATE OF CORRECTION

PATENT NO. : 4,402,172
DATED : September 6, 1983
INVENTOR(S) : Duane A. Krueger

It is certified that error appears in the above-identified patent and that said Letters Patent is hereby corrected as shown below:

In column 2 at line 10 and in column 3 at line 11 the phrase "a fused ring organic acid anhydride" are replaced by "an organic acid anhydride".

In Claim 1 in column 5 at line 35, the phrase "a fused ring" is replaced by "a cyclic organic".

Signed and Sealed this

Sixth Day of August 1985

[SEAL]

*Attest:*

DONALD J. QUIGG

*Attesting Officer*   *Acting Commissioner of Patents and Trademarks*